United States Patent
Carty et al.

[15] 3,678,079
[45] July 18, 1972

[54] FIBROUS GLASS FILLED POLYCARBONATE RESINS

[72] Inventors: Edward J. Carty, Pittsfield, Mass.; Francis C. McDowell, Delmar, N.Y.

[73] Assignee: General Electric Company

[22] Filed: Jan. 4, 1972

[21] Appl. No.: 215,424

Related U.S. Application Data

[63] Continuation-in-part of Ser. No. 75,709, Sept. 25, 1970, abandoned.

[52] U.S. Cl. .................................. 260/37 PC, 117/126 GR
[51] Int. Cl. ........................................................ C08g 51/10
[58] Field of Search .................... 260/37 PC; 117/126 GR

[56] References Cited

UNITED STATES PATENTS 3,488,317  1/1970  Hechelhammer et al. ......... 260/37 PC Primary Examiner—Morris Liebman
Assistant Examiner—S. M. Person
Attorney—William F. Mufatti, et al.

[57] ABSTRACT

An aromatic carbonate polymer having uniformly dispersed therein finely divided fibrous glass filaments. The glass filaments employed herein are those that have been treated or coated with a particular binding agent, namely a styrene-ethyl acrylate copolymer.

6 Claims, No Drawings

FIBROUS GLASS FILLED POLYCARBONATE RESINS

This application is a continuation-in-part of U.S. patent application Ser. No. 75,709, filed Sept. 25, 1970 now abandoned.

This invention is directed to a glass reinforced aromatic polycarbonate resin which contains uniformly dispersed therein finely divided fibrous glass which contains a particular binding agent thereon. The particular binding agent is a styrene-ethyl acrylate copolymer.

Fibrous glass, when incorporated with a thermoplastic polymer, beneficially aids the mechanical properties of the polymer which results in greater application thereof. However, in the manufacture of fibrous glass, filaments are first formed through the use of various processes. The filaments are then gathered into a bundle known as a strand. In order to bind the filaments into a strand so that the strand can be handled, a binder or binding agent is applied to the glass filaments. Subsequently, the strand can be chopped into various lengths as desired. These are called chopped strands. Some of these binding agents are polymers such as polyvinyl acetate, particular polyester resins, polycarbonates, starch, acrylic-melamine, polyvinyl chloride, polyethylene oxide or polyvinyl alcohol. In the particular area of thermoplastic aromatic polycarbonate resins, the fibrous glass greatly enhances the mechanical properties of the polycarbonate resin. Unfortunately, the fibrous glass also has an adverse affect on the polycarbonate resin in that the fibrous glass degrades and discolors the polycarbonate resin. It has now been surprisingly discovered that by incorporating with an aromatic polycarbonate resin, fibrous glass that has been treated with a particular binding agent, the adverse effects indicated above are eliminated.

Therefore, it is an object of this invention to provide an aromatic carbonate polymer having uniformly dispersed therein fibrous glass filaments that have been treated with a particular binding agent.

Another object of this invention is to provide an aromatic carbonate polymer having uniformly dispersed therein fibrous glass filaments that have been treated with a styreneethyl acrylate copolymer binding agent.

These and other objects of this invention will become apparent from the following detailed description thereof.

Briefly, according to this invention, the foregoing and other objects are attained by blending fibrous glass filaments with an aromatic carbonate polymer, which fibrous glass filaments have been treated with a particular binding agent. The fibrous glass employed herein is chopped glass strands which have been treated with a styrene-ethyl acrylate copolymer binding agent. These chopped glass strands may be blended with the aromatic carbonate polymer and the blend fed into an extruder and the extrudate comminuted into pellets having a length of approximately one-eighth to one-fourth inches long. The pellets have fibrous glass filaments uniformly dispersed therein.

The following examples are set forth to illustrate more clearly the principle and practice of this invention to those skilled in the art. Unless otherwise specified, where parts or percentages are mentioned, they are parts or percentages by weight.

EXAMPLE I

A polycarbonate, prepared from 2,2-bis(4-hydroxyphenyl)-propane (bisphenol-A) and phosgene, having an intrinsic viscosity of 0.62 as measured in dioxane at 30° C., is blended in a laboratory blender at room temperature with chopped glass strands of about one-eighth inch long. The glass strands are composed of filaments treated with the various binding agents indicated in Table 1 below. Each blend contains about 20 weight per cent of glass strands based on the total weight of the blend and, correspondingly, about 80 weight per cent of the polycarbonate. The blends are then separately fed into an extruder and pelletized. Test bars are injection molded at about 525° F. with each blend. Each set of test bars containing the fibrous glass employing the various binding agents are evaluated for degradation as determined by the change in intrinsic viscosity of the polymer and discoloration as determined visually. The results are as follows:

TABLE 1

| Binding Agent | Intrinsic Viscosity* | Color |
| --- | --- | --- |
| 1. Styrene-ethyl acrylate[1] | 0.61 | Colorless |
| 2. Polyvinyl acetate | 0.43 | Dark brown |
| 3. Polyester | 0.45 | Dark brown |
| 4. Polycarbonate | 0.44 | Dark brown |
| 5. Polyethylene oxide | 0.41 | Tan |
| 6. Control - polycarbonate only | 0.62 | Colorless |

*Measured in dioxane at 30° C.
[1] Copolymer of 30 weight percent of styrene and 70 weight percent of ethyl acrylate residue.

EXAMPLE II

Example I is repeated except that in place of the polycarbonate, a copolymer of 65 weight per cent of tetrachlorobisphenol-A and 35 weight per cent of bisphenol-A are employed herein having an intrinsic viscosity of 0.52 measured in dioxane at 30° C. The results are as follows:

TABLE 2

| | Binding Agent | Intrinsic Viscosity* | Flexural Modulus | Color |
| --- | --- | --- | --- | --- |
| 1. | Control 0.52 | | 351,000 psi | Colorless |
| 2. | Styrene-ethyl acrylate[1] 0.52 | | 672,000 psi | Colorless |

*Measured in dioxane at 30° C.
[1] copolymer of 30 weight percent of styrene and 70 weight percent of ethyl acrylate residue.

The instant invention is directed to fibrous glass reinforced aromatic carbonate polymers, wherein fibrous glass filaments are uniformly dispersed therein. The particular fibrous glass filaments employed herein are those that have been treated with a particular binding agent, namely a styrene-ethyl acrylate copolymer. The styrene-ethyl acrylate copolymer employed herein may consist of from about 10–75 weight per cent of the residue of styrene and correspondingly 90–25 weight per cent of the residue of ethyl acrylate in the copolymer based on the total weight of the copolymer. As shown from the examples, the critical feature of the instant invention lies in the particular binding agent employed to treat the fibrous glass filaments. Obviously, other materials can also be employed with the binding agent so used in this invention and include such materials as antistatic agents, coupling agents, wetting agents, etc. In addition, other ingredients may be employed with the polycarbonate resin such as pigments and other fillers.

Generally, the aromatic polycarbonates are polymers of dihydric phenols. The dihydric phenols that can be employed herein are bisphenols such as 1,1-bis(4-hydroxyphenyl) methane, 2,2-bis(4-hydroxyphenyl) propane, 2,2-bis(4-hydroxy-3-methylphenyl) propane, 4,4-bis(4-hydroxyphenyl) heptane, etc., dihydric phenol ethers such as bis(4-hydroxyphenyl) ether, bis(3,5-dichloro-4-hydroxyphenyl) ether, etc., dihydroxy diphenyls such as p,p'-dihydroxydiphenyl, 3,3'-dichloro-4,4'-dihydroxydiphenyl, etc., dihydroxyaryl sulfones such as bis(4-hydroxyphenyl) sulfone, bis-(3,5-dimethyl-4-hydroxyphenyl)sulfone, bis(3-methyl-5-ethyl-4-hydroxyphenyl) sulfone, etc., dihydroxy benzenes such as resorcinol and hydroquinone, halo- and alkyl-substituted dihydroxy benzenes such as 1,4-dihydroxy-2-chlorobenzene, 1,4-dihydroxy-2,3-dichlorobenzene, 1,4-dihydroxy-3-methylbenzene, etc. and dihydroxy diphenyl sulfoxides such as bis(4-hydroxyphenyl) sulfoxide, bis-(3,5-dibromo-4-hydroxyphenyl) sulfoxide, etc. A variety of additional dihydric phenols are also available to provide carbonate polymers and are disclosed in U.S. Pat. Nos. 2,999,835, 3,028,365 and 3,153,008. Also suitable for preparing the aromatic carbonate polymers are copolymers prepared from any of the above copolymerized with halogen-containing dihydric phenols such as 2,2-bis(3,5-dichloro-4-hydroxyphenyl) propane, 2,2-bis(3,5-dibromo-4-hydroxyphenyl) propane, etc. Also employed in the practice of this invention may be blends of any of the above materials to provide the aromatic carbonate polymer. Particularly useful are blends of a homopolymer of 2,2-bis(4-hydroxyphenyl) propane (bisphenol-A with a copolymer of bisphenol-A and 2,2-bis(3,5-dibromo-4-hydroxyphenyl) propane (tetrabromobisphenol-A). Specifically, these may be a blend of 30–99 weight per cent of a homopolymer of bisphenol-A and, correspondingly, 70-1 weight per cent of the copolymer. The copolymer employed herein is one consisting of 40–65 weight per cent of bisphenol-A and correspondingly 60–35 weight per cent of tetrabromobisphenol-A. Particularly useful in the practice of this invention is the homopolymer of bisphenol-A.

The carbonate polymers employed in the practice of this invention are those that are prepared by reacting the dihydric diphenol with a carbonate precursor. The carbonate precursor may be either a carbonyl halide, a carbonate ester or a haloformate. The carbonyl halides which can be employed herein are carbonyl bromide, carbonyl chloride, carbonyl fluoride, etc., or mixtures thereof. Typical of the carbonate esters which may be employed herein are diphenyl carbonate, di-(halophenyl) carbonates such as di-(chlorophenyl) carbonate, di-(bromophenyl) carbonate, di- (trichlorophenyl) carbonate, di-(tribromophenyl) carbonate, etc., di-(alkylphenyl) carbonate such as di-(tolyl) carbonate, etc., di-(naphthyl) carbonate, di-(chloronaphthyl) carbonate, phenyl tolyl carbonate, chlorophenyl chloronaphthyl carbonate, etc. or mixtures thereof. The haloformates suitable for use herein include bishaloformates of dihydric phenols (bischloroformates of hydroquinones, etc.) or glycols (bishaloformates of ethylene glycol, neopentyl glycol, polyethylene glycol, etc.). While other carbonate precursors will occur to those skilled in the art, carbonyl chloride also known as phosgene is preferred.

The preparation of the carbonate polymers of this invention may be prepared by also employing a molecular weight regulator and an acid acceptor. The molecular weight regulator which may be employed in the reaction process is generally a monofunctional hydroxy compound such as phenol, cyclohexanol, methanol, parabromophenol, or p-tertiary butyl phenol.

The acid acceptor may be either an organic or an inorganic compound. Suitable organic acid acceptors that may be employed herein are the tertiary amines that include such materials as pyridine, triethylamine, dimethylaniline, tributylamine, etc. The inorganic acid acceptor may be one which can be either an hydroxide, a carbonate, a dicarbonate, or a phosphate of an alkali or alkaline earth metal.

The chopped glass strands that are employed in the practice of this invention are glass strands which have been treated with a styrene-ethyl acrylate copolymer binding agent. Specifically, glass filaments, when prepared, easily abrade each other, and therefore, require a surface treatment with a material which will not only protect the filament but also bind the filaments together into a strand so that they can be handled. In the instant invention, it is the particular binding agent that is the critical feature herein, namely a styrene-ethyl acrylate copolymer. In preparing the strands, a number of filaments are formed simultaneously, treated with the binding agent and then bundled into what is called a strand. Alternatively the strand itself may be first formed of filaments and then treated with a binding agent. The amount of the copolymer employed is generally that amount which is sufficient to bind the glass filaments into a continuous strand. Generally, this may be about 1.0 weight per cent based on the weight of the glass filament. However, the amount of styrene-ethyl acrylate copolymer employed as a binding agent is not critical. It is the copolymer itself that is critical. As employed, the chopped glass strands may be one-fourth inch long or less and are preferably one-eighth inch long. They may also be longer than one-fourth inch in length if desired. In the practice of this invention, the chopped glass strand may be first blended with the carbonate polymer material and then fed to an extruder and the extrudate comminuted into pellets, or they may be separately fed to the feed hopper of an extruder. Generally, in the practice of this invention for preparing pellets of the composition set forth herein, the extruder is maintained at a temperature of approximately 525° F. The pellets so prepared when comminuting the extrudate may be one-fourth inch long or less. As stated previously, such pellets consist of finely divided uniformly dispersed fibrous glass in the aromatic carbonate polymer. The dispersed glass fibers are about 0.001 to about 0.10 inch long as a result of the shearing action on the chopped glass strands in the extruder barrel. In addition, the amount of glass incorporated into the polymer can range anywhere from about 5 to about 50 weight per cent based on the total weight of the composition of carbonate polymer and glass fibers.

The injection molding pellets so prepared as disclosed in the above paragraph are pellets having uniformly distributed throughout fibrous glass filaments of the size indicated above, namely 0.001 to about 0.10 inches long. Due to the extrusion process, the fibrous glass filaments are all essentially parallel and uniformly distributed throughout the injection molding pellet.

The composition of this invention finds utility in molding articles by injection molding, compression molding or even blow molding wherein the articles have greatly increased strength by employing the fibrous glass so described herein. When so employing the particular fibrous glass, discoloration and degradation of the molded polycarbonate article does not occur.

It will thus be seen that the objects set forth above, among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

What is claimed is:

1. An aromatic carbonate polymer having uniformly dispersed therein finely divided fibrous glass filaments, which glass filaments have been treated with a styrene-ethyl acrylate copolymer binding agent wherein said styrene-ethyl acrylate copolymer consists of 10–75 weight percent of the residue of styrene and correspondingly 90–25 weight percent of the residue of ethyl acrylate based on the total weight of the copolymer and wherein said aromatic carbonate polymer is the reaction product of a dihydric phenol and a carbonate precursor.

2. The composition of claim 1 wherein the carbonate polymer contains from about 5 to about 50 weight percent of the fibrous glass based on the total weight of the composition.

3. The composition of claim 1 wherein the carbonate polymer is a homopolymer of bisphenol-A.

4. The composition of claim 1 wherein the carbonate polymer is a copolymer of at least 35 weight percent of bisphenol-A with the balance being tetrachlorobisphenol-A.

5. The composition of claim 1 wherein the carbonate precursor is phosgene.

6. The composition of claims 1 wherein the carbonate polymer is a blend of (1) at least 70 weight percent of a homopolymer of bisphenol-A and (2) the balance being a copolymer of 60–35 weight percent of tetrabromobisphenol-A and correspondingly 40–65 percent of bisphenol-A.

* * * * *